US008754639B2

(12) United States Patent
Puchianu et al.

(10) Patent No.: US 8,754,639 B2
(45) Date of Patent: Jun. 17, 2014

(54) TRANSFORMER TESTING

(75) Inventors: Silviu Puchianu, Bristol (GB); Steven Lewis Simpson, Bristol (GB); Graham Thomas Morley, Bristol (GB)

(73) Assignee: Vetco Gray Controls Limited, Nailsea, Bristol (GB)

( * ) Notice: Subject to any disclaimer, the term of this patent is extended or adjusted under 35 U.S.C. 154(b) by 66 days.

(21) Appl. No.: 13/164,844

(22) Filed: Jun. 21, 2011

(65) Prior Publication Data

US 2011/0316659 A1 Dec. 29, 2011

(30) Foreign Application Priority Data

Jun. 28, 2010 (EP) .................................... 10167581

(51) Int. Cl.
*G01B 7/14* (2006.01)

(52) U.S. Cl.
USPC ...... 324/207.18; 336/213; 336/210; 336/233; 324/545

(58) Field of Classification Search
USPC .............. 336/213, 233, 210; 324/207.18, 545
See application file for complete search history.

(56) References Cited

U.S. PATENT DOCUMENTS 3,037,177 A 5/1962 Marsh et al.
4,085,347 A * 4/1978 Lichius .................. 310/216.065
4,506,248 A * 3/1985 Lin .............................. 336/233
4,529,457 A * 7/1985 Kushnick ...................... 148/534
4,853,292 A * 8/1989 Bruckner ...................... 428/600
6,867,364 B2 * 3/2005 Hafskjold et al. .............. 174/50
7,358,637 B2 * 4/2008 Tapper ..................... 310/156.08

FOREIGN PATENT DOCUMENTS

EP 0339215 A1 2/1989
EP 1473377 A1 3/2004
GB 990520 A 4/1965

OTHER PUBLICATIONS

Forrester, N.C. Ed—Institute of Electrical and Electronics Engineers: "Power Transformer Design for Tethered Underwater Vehicles," Mastering the Oceans Through Technology. Newport, Rhode Island, Oct. 26-29, 1992; vol. 2, pp. 877-882.
European Search Report issued in connection with EP Application No. 10167581.7, Dec. 27, 2010.

* cited by examiner

*Primary Examiner* — Arleen M Vazquez
*Assistant Examiner* — Alesa Allgood
(74) *Attorney, Agent, or Firm* — Global Patent Operation

(57) ABSTRACT

A method of testing a transformer prior to installation in a high-pressure environment wherein the transformer comprises a transformer core comprising a stack of a plurality laminations, is provided. The method comprises applying a mechanical compression force to the stack, the force being at least equivalent to the ambient pressure of the high-pressure environment; and testing the electrical efficiency of the transformer.

10 Claims, 3 Drawing Sheets

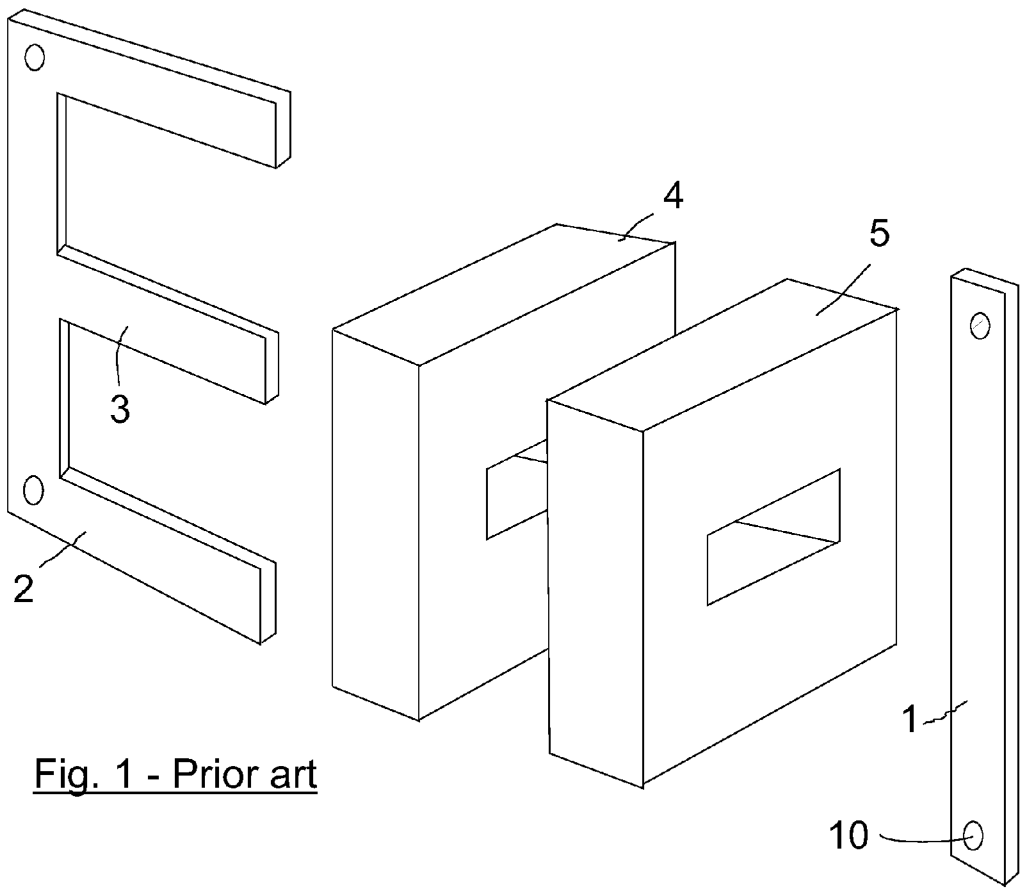
Fig. 1 - Prior art
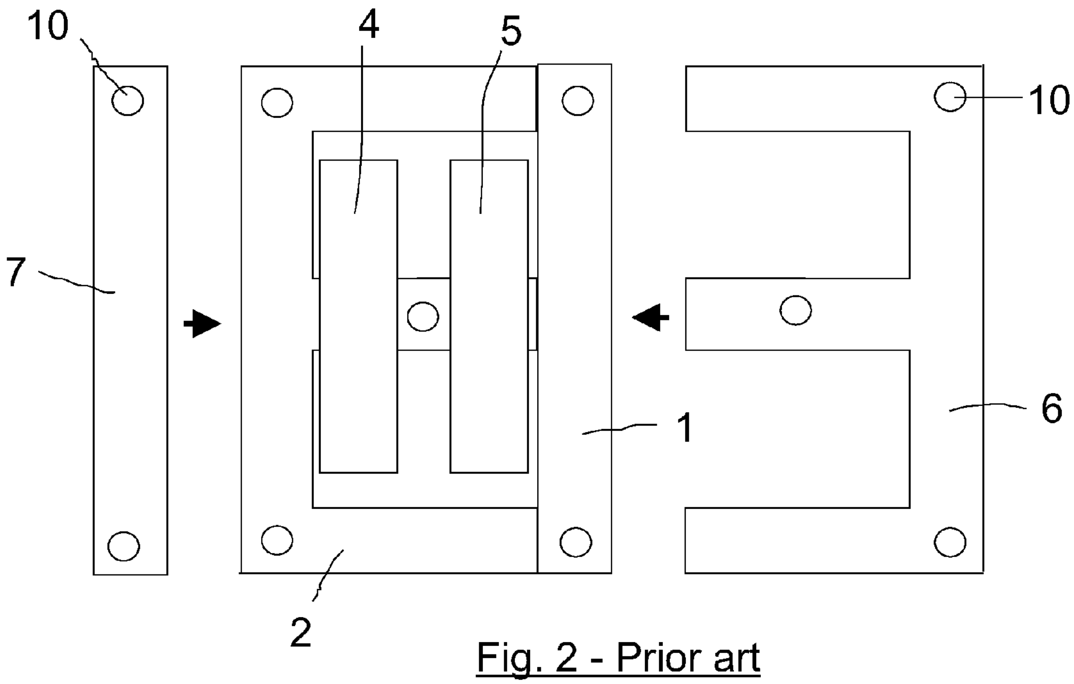
Fig. 2 - Prior art

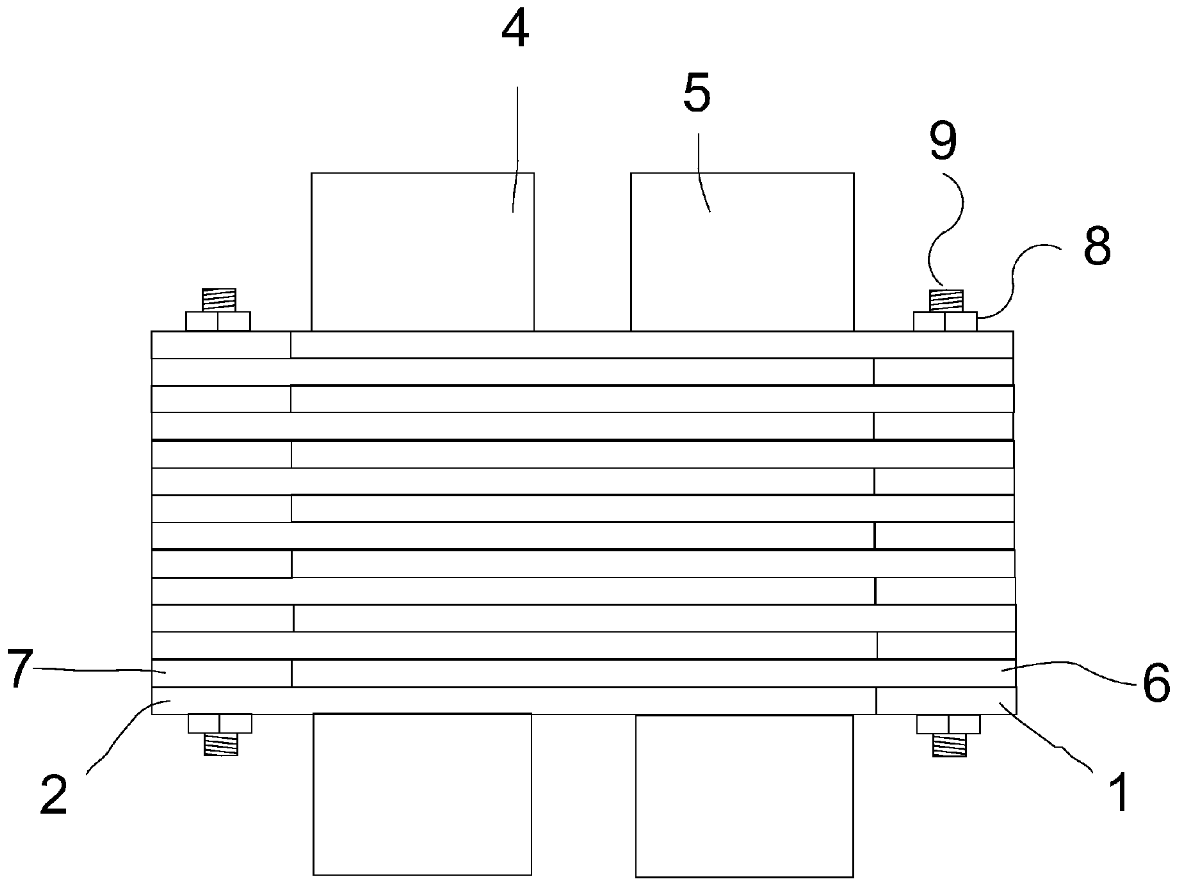
Fig. 3 - Prior art

TRANSFORMER TESTING

BACKGROUND OF THE INVENTION

1. Field of the Invention

Embodiments of the present invention relate to a method of testing a transformer prior to installation in a high-pressure environment and a transformer.

2. Description of the Prior Art

In underwater, for example subsea, electrical power distribution applications, transformers are increasingly used in pressure-compensated enclosures. The transformer is housed in an enclosure containing oil, and when deployed under water, the oil pressure is made equal to the external water pressure so the transformer may therefore operate in oil at very high pressures, for example equivalent to 3,000 m depth or more. The magnetic core of the transformer is typically formed from varnish-covered core-elements, and such high pressures can have a damaging effect upon these. Such varnished-covered core-elements are typically shaped as "I" and "E" profiles, though other form-factors may be used. The core elements may be formed from metals such as steel, or nickel/iron alloys etc.

FIGS. 1 to 3 illustrate a typical simple 50 Hz transformer construction with an iron/nickel alloy core. This comprises a plurality of laminations, typically between 0.5 and 0.35 mm thick. The laminations shown comprise core-elements of the so-called the "I" and "E" profiles, 1 and 2 respectively. During the assembly process shown schematically in FIG. 2, for each lamination, the centre arm 3 of the "E" core-element 2 is passed through the centre of dual bobbins 4 and 5, which carry the required windings. The "E" core-element 2 is arranged to butt up to the "I" core-element 1. Each lamination is assembled in the reverse sense to its adjacent lamination(s), as shown in FIG. 2, where for the second layer of laminations, the "E" core-element 6 is assembled in the opposite direction to the first "E" core-element 2 and butts up to an "I" core-element 7 at the opposite side of the bobbins 4, 5 to the first "I" core-element 1. The process is continued to form a stack of laminations, and the complete assembled stack is held together with nuts 8 and screwed rods 9 (shown in FIG. 3) located through holes 10 in the core-elements. An end-on view of the transformer when partially assembled is shown in FIG. 3.

One of the most common pressure-related failure modes is as follows: under pressure, the core-elements may be "pushed" one against the other, such that there is a possibility of the varnish being damaged. This can result in short-circuits between the core-elements and, consequently, higher than normal induced electrical currents, which may cause the core to heat up. This temperature increase may dramatically decrease the efficiency of the transformer and could result in its destruction.

One known solution to this problem is to use pressure-testing facilities prior to installation of the transformer. Here, a transformer is placed in a pressurised housing, the pressure being chosen to best simulate the ambient pressure of the installation environment. However, these facilities are very expensive to use and hire, and indeed many transformer manufacturers do not have such a facility.

Embodiments of the present invention provide a technique to reduce transformer failures in relatively high ambient pressure environments. This aim is achieved by testing transformers to identify potential failures prior to deployment, by simulating the high barometric pressure that the core elements will be subjected to when the transformer is installed, for example at a subsea location. Unlike known pressure-testing facilities, embodiments of the present invention make use of a mechanical compression force applied to the transformer.

This simulation is achieved by the temporary application of a compression force on the laminations of a transformer. This may be achieved for example by tightening lamination securing hardware and spreading the compression force across the laminations to a point where the compression force is at least similar to that which the transformer will be subjected to by ambient pressure at installation. Thus the applied compression simulates the conditions that the laminations are subjected to when the transformer is installed subsea. The transformer is tested electrically, for example during or after the applied lamination compression, to reveal any increase in losses which have resulted from any short circuits between laminations which have been caused by the high compression.

SUMMARY OF THE INVENTION

In accordance with an embodiment of the present invention there is provided a method of testing a transformer prior to installation in a high-pressure environment wherein the transformer comprises a transformer core comprising a stack of a plurality laminations. The method comprises applying a mechanical compression force to the stack, the force being at least equivalent to the ambient pressure of the high-pressure environment; and testing the electrical efficiency of the transformer.

In accordance with an alternate embodiment of the present invention there is provided a transformer. The transformer comprises a transformer core comprising a stack of a plurality of laminations, each of the plurality of laminations comprising at least one aperture, wherein the laminations are stacked such that the aperture of each lamination is positioned around a rod member; a fastening member positioned in co-operative engagement with the rod member; and a distribution element positioned between the stack and the fastening member.

BRIEF DESCRIPTION OF THE DRAWINGS

Embodiments of the present invention will now be described with reference to the accompanying drawings, in which:

FIG. 1 schematically shows in exploded view a portion of a known transformer;

FIG. 2 schematically shows a method of manufacturing the transformer of FIG. 1;

FIG. 3 schematically shows an end view of the partially assembled transformer of FIGS. 1 and 2;

FIGS. 4 and 5 illustrate a transformer suitable for testing according to an embodiment of the present invention, where, as far as possible, similar items have retained the numbering previously used with respect to FIGS. 1 to 3.

DETAILED DESCRIPTION OF THE INVENTION

Figure 4:
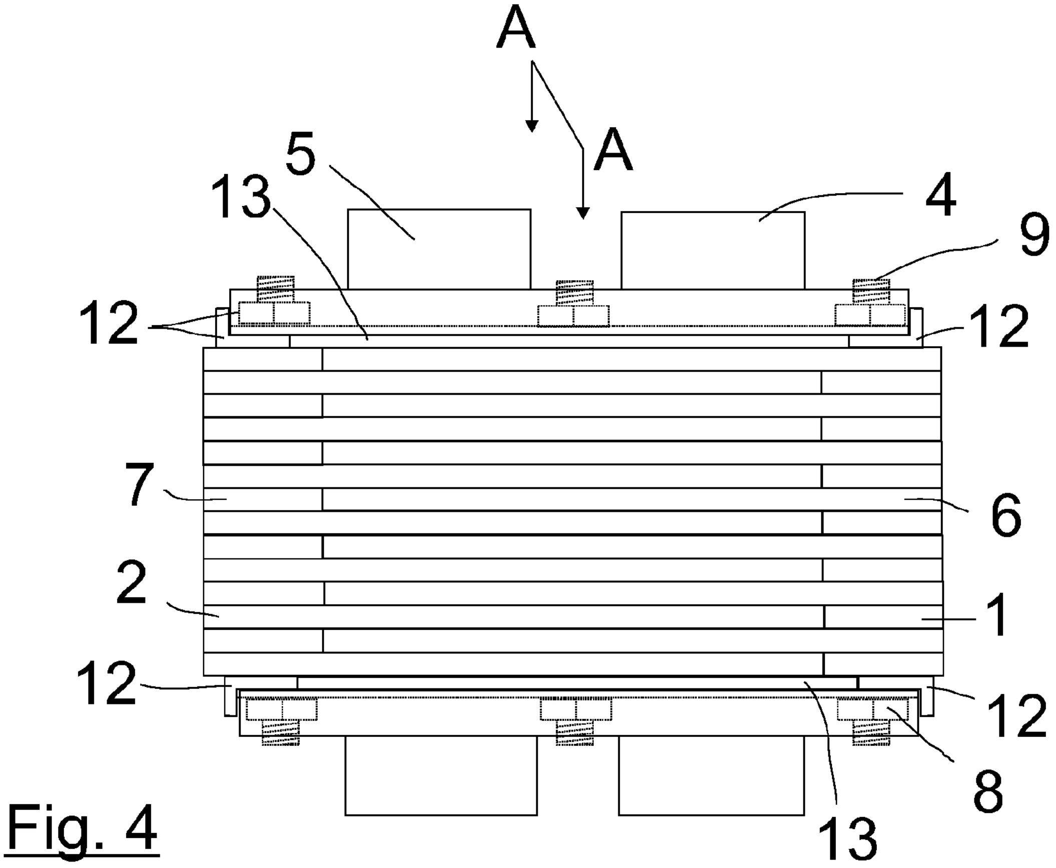
FIG. 4 schematically shows a transformer tested in accordance with an embodiment of the present invention.
Figure 5:
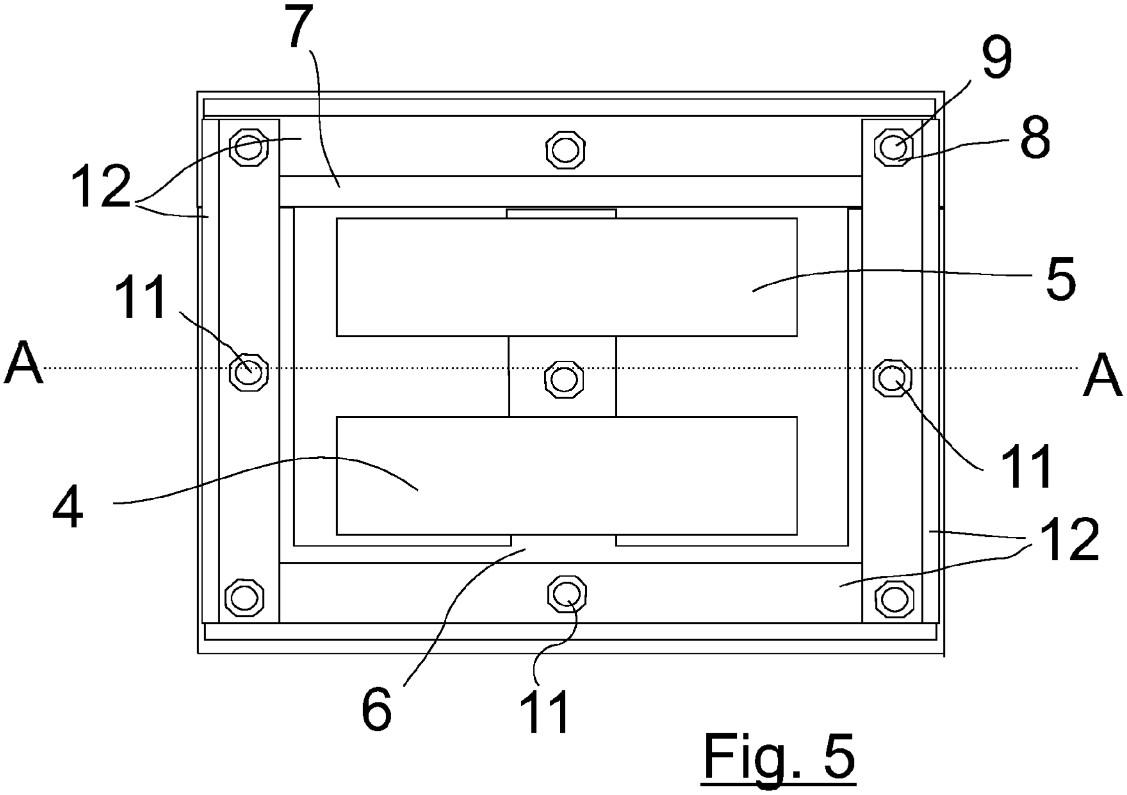
FIG. 5 schematically shows a plan view of the transformer of FIG. 4.

In a generally similar manner to the transformer shown in FIG. 3, the transformer comprises dual bobbins 4 and 5, surrounded by a plurality of laminations comprising "I" and "E" core elements 1, 2, 6 and 7. The laminations are stacked and held together by a plurality of threaded rod members 9 which sit within apertures 11 provided within the core-elements. The transformer has additional apertures compared to the known transformer of FIG. 3, to improve compression force distribution as will be described below.

Each rod member 9 is in co-operative engagement with fastening means, in this case a nut, 8 which is provided at each end of each rod member 9, such that the stack of laminations is held together.

Distribution elements 12 are placed between the stack and the fastening members 8. Each element 12 is a rigid member being dimensioned so as to substantially overlie at least one axis of the plane of the laminations in use. As shown, each element 12 is a beam of "L"-shaped cross-section, the length of the beam being generally similar to either the length or width of the laminations such that the compression force is at least partially distributed about the extent of the stack. Additionally, spacers 13 may be provided between elements 12 and the stack in order to ensure consistent pressure transmission between the element and stack, as will be described below.

Prior to installation of the transformer in a high-pressure environment, a mechanical compression force is applied to the stack. Here, the nuts 8 are tightened, i.e. moved relative to the rod members 9, to a specified torque calculated for the particular mechanical arrangement, to apply a mechanical compression force to the stack. The compression force is evenly distributed across the extent of the laminations by virtue of the additional apertures and rod members 9 compared to the prior art transformer, the provision of distribution elements 12 and spacers 13.

The force applied is at least equivalent to the ambient pressure of the high-pressure environment in which the transformer will be installed. Ideally, the force applied is greater than the pressure, to allow for errors and for more robust testing.

Prior to installation of the transformer in a high-pressure environment, the electrical efficiency of the transformer is tested. This testing is used in particular to identify losses associated with inter-lamination insulation failure. Current or voltmeters may be used, and additionally temperature sensors may be used to identify locally warm regions of the transformer, which may be associated with insulation failure.

The testing may be performed while the compression force is applied. Alternatively, testing may take place after the compression force has been removed, i.e. by loosening the nuts 8 (see below).

Advantageously, the similar testing may be carried out before the compression force is applied, the results of the pre- and post-compression tests may be compared.

If the test results indicate that the transformer is damaged or compromised, then it is rejected.

Prior to installation of the transformer in a high-pressure environment, the compression of the laminations is relaxed to the normal level specified for the minimization of vibration of the laminations during transformer operation.

As noted above, electrical testing may take place after this step.

It is to be understood that the term "high-pressure environment" encompasses any environment which is at an ambient pressure higher than a normal surface air pressure range.

Embodiments of the present invention provide various advantages over the prior art. Most particularly, the reliability of the transformer can be determined, so that the likelihood of post-installation failure is much reduced. This in turn may save the substantial costs often incurred shortly after a conventional transformer fails or becomes unacceptably lossy after it is installed subsea. Embodiments of the present invention also provide a cheaper alternative to currently employed pressure testing facilities, with a small increase in production costs from consideration of the transformer design.

The above-described embodiments are exemplary only, and other possibilities and alternatives within the scope of the invention will be apparent to those skilled in the art.

Although transformers usually have a single bobbin to hold the windings, a split bobbin design, as shown in the figures, is preferred for this invention as it allows for additional holes in the E laminations to provide more mechanical load spreading. However, the invention may still be used with single bobbin transformers.

While a transformer having "I" and "E" type core elements has been described, the invention is not so limited, and any type of lamination may be used.

Different ways of applying the compression force may be employed. For example, the rod members may be bolt-like, such that they have a flange at one end. In this case, only one nut is required per rod. Alternatively, other compression techniques may be used instead of the screw threading previously described, e.g. using clamps.

Different forms of distribution elements may be used, for example plates. Alternatively, depending on the transformer design, the distribution elements may be omitted completely.

What is claimed is:

1. A method of testing a subsea transformer configured for installation in a high-pressure environment, the high pressure environment comprising a subsea installation, wherein the transformer comprises a transformer core comprising a stack of a plurality laminations, the method comprising: applying a mechanical compression force to the stack of the plurality of laminations of the subsea transformer, the force being at least equivalent to the ambient pressure of the high-pressure environment, wherein the mechanical compression force is applied using a plurality of distribution elements that overlay the plurality of laminations and distribute the force uniformly across the laminations; and testing the electrical efficiency of the transformer, and wherein each lamination comprises a plurality of core elements.

2. The method according claim 1, wherein the mechanical compression force applied to the stack is greater than that equivalent to the ambient pressure of the high-pressure environment.

3. The method according to claim 1, further comprising removing the applied mechanical compression force.

4. The method according to claim 3, wherein removing the compression force occurs subsequent to testing the electrical efficiency of the transformer.

5. The method according to claim 3, wherein removing the compression force occurs prior to testing the electrical efficiency of the transformer.

6. The method according to claim 1, wherein each of the plurality of laminations comprises at least one aperture, and wherein the method further comprises stacking the laminations such that the aperture of each lamination is positioned around a rod member.

7. The method according to claim 6, wherein a fastening member is placed in co-operative engagement with the rod member, and wherein applying a mechanical compression force to the stack comprises moving the fastening member relative to the rod member to apply the mechanical compression force to the stack.

8. The method according to claim 7, wherein the rod member is threaded, and the fastening member comprises a nut for engagement with the thread of the rod member.

9. The method according to claim 1, wherein the distribution element is placed between the stack and the fastening member, such that the mechanical compression force is at least partially distributed about the extent of the stack.

10. The method according to claim 9, wherein the distribution element comprises a rigid member being dimensioned so as to substantially overlie at least one axis of the plane of the laminations in use.

* * * * *